US012037812B2

(12) United States Patent
Lin

(10) Patent No.: US 12,037,812 B2
(45) **Date of Patent: *Jul. 16, 2024**

(54) LOCK CORE STRUCTURE

(71) Applicant: Yu-Pin Lin, Tainan (TW)

(72) Inventor: Yu-Pin Lin, Tainan (TW)

( * ) Notice: Subject to any disclaimer, the term of this patent is extended or adjusted under 35 U.S.C. 154(b) by 331 days.

This patent is subject to a terminal disclaimer.

(21) Appl. No.: 17/649,065

(22) Filed: Jan. 27, 2022

(65) Prior Publication Data

US 2023/0295956 A1 Sep. 21, 2023

(51) Int. Cl.
*E05B 29/00* (2006.01)

(52) U.S. Cl.
CPC .......... *E05B 29/0013* (2013.01); *E05B 29/00* (2013.01); *E05B 29/0053* (2013.01)

(58) Field of Classification Search
CPC .. E05B 29/013; E05B 29/0053; E05B 29/006; E05B 29/0066; E05B 29/0033; E05B 29/0026; E05B 17/002; E05B 17/007; E05B 21/066; E05B 27/0057; E05B 27/0082; E05B 31/00; E05B 15/14; E05B 67/24; E05B 9/04; E05B 55/005
See application file for complete search history.

(56) References Cited

U.S. PATENT DOCUMENTS 4,225,008 A * 9/1980 Colell .................... E05B 29/00 70/237
5,765,417 A * 6/1998 Bolton .................... E05B 29/00 70/495
11,591,822 B2 * 2/2023 Wang .................. E05B 29/0046
2009/0145186 A1 * 6/2009 Reese .................. E05B 21/066 70/380
2015/0152666 A1 * 6/2015 Ho .......................... E05B 29/00 70/353
2016/0186461 A1 * 6/2016 Wehr .................... E05B 21/066 70/359
2018/0171662 A1 * 6/2018 Lin ..................... E05B 29/0066
2021/0381275 A1 * 12/2021 Wunderlich ........ E05B 19/0023
2023/0235594 A1 * 7/2023 Lin ..................... E05B 27/0057 70/365
2023/0265681 A1 * 8/2023 Lin ..................... E05B 29/0066 70/355

* cited by examiner

*Primary Examiner* — Kristina R Fulton
*Assistant Examiner* — Noah Horowitz

(57) ABSTRACT

A lock core structure composed of a lock core seat, a lock core shell, a push plate, lock plates, washers, a positioning plate, a latch lever, a brake bolt plate pushed by a compression spring, a positioning baffle, and a retaining ring. An accommodating chamber of the seat is provided with an accommodating groove, a ring groove, a shaft hole and a groove, an inner bottom surface of the shell is provided with a slide groove for disposing the push plate, the brake bolt plate is provided in the accommodating groove, and provided with a pivot shaft disposed in the shaft hole, the positioning baffle is provided in the chamber and provided with a first baffle corresponding to an embedding groove of the seat, and a second baffle corresponding to the accommodating groove and the groove, and the retaining ring is embedded in the ring groove.

1 Claim, 9 Drawing Sheets

LOCK CORE STRUCTURE

BACKGROUND OF THE INVENTION

Field of Invention

The invention relates to a lock core structure, and more particularly to an inner bottom surface of a lock core shell being provided with a push plate, and inside a lock core seat being provided with a brake bolt plate, so that the lock core cannot be rotated when a key is not completely inserted to reach the inner bottom surface of the lock core shell, thereby an optimum anti-theft efficacy can be achieved.

Related Art

For the lock core structure of a conventional disk tumbler lock, please refer to FIGS. 1 and 2. The conventional disk tumbler lock is mainly provided with a lock core 1 composed of a lock core seat 10, a lock core shell 11, a latch lever 12, a plurality of lock plates 13, a plurality of washers 14, and a positioning plate 15. The lock core seat 10 is provided with an accommodating chamber 100, an inner wall surface of the accommodating chamber 100 is provided with an embedding groove 101, and the latch lever 12 is embedded in the embedding groove 101. The lock core seat 10 is provided with a key insertion hole 102, the lock core shell 11 is disposed in the accommodating chamber 100 of the lock core seat 10, and a wall surface of the lock core shell 11 is provided with a cutting groove 110 and a notch 111. A part of the latch lever 12 is embedded in the cutting groove 110 of the lock core shell 11, the lock plates 13 and the washers 14 are alternately provided in the lock core shell 11. Each of the lock plates 13 is provided with a key hole 130, an outer edge of each of the lock plates 13 is provided with an arc notch 131, the arc notch 131 is provided for embedding the latch lever 12, the outer edge of each of the lock plates 13 is further provided with a protrusion 132, and the protrusion 132 is disposed in the notch 111 of the lock core shell 11. Each of the washers 14 is provided with a perforation 140, an outer edge of each of the washers 14 is provided with an arc notch 141, the arc notch 141 is provided for embedding the latch lever 12, the outer edge of each of the washers 14 is further provided with a flange 142, and the flange 142 is disposed in the notch 111 of the lock core shell 11. The positioning plate 15 is disposed at an end portion of the lock core shell 11, a key hole 150 is provided on the positioning plate 15, and two corresponding long edges of the key hole 150 are provided with a convex body 151 respectively. Thereby, the lock core structure of the conventional disk tumbler lock is formed, by inserting a key from the key insertion hole 102 of the lock core seat 10 into the key hole 150 of the positioning plate 15, the key hole 130 of each of the lock plates 13 and the perforation 140 of each of the washers 14 in the lock core shell 11, after a guide groove on the key is aligned with the convex bodies 151 on the positioning plate 15, and cut grooves on two opposite wall surfaces of the key are aligned with the positions of each of the lock plates 13 and each of the washers 14, the key can be rotated to drive the lock core shell 11 to rotate to achieve the unlocking and locking actions. However, if an incorrect key is inserted into the key hole 130 of each of the lock plates 13 in the lock core shell 11 of the conventional disk tumbler lock, each of the lock plates 13 can still be rotated about ninety degrees (that is, an angle of the notch 111 on the lock core shell 11. If a user does not fully insert the key to reach the inner bottom surface of the lock core shell 11 or a burglar turns the lock forcefully with an incorrect key, the key hole 130 of the lock plate 13 or the key will be deformed or broken, which will easily lead to unsmooth rotation when unlocking and locking the lock core in the future, and will easily affect its anti-theft effect.

SUMMARY OF THE INVENTION

A main object of the invention is to provide a lock core structure capable of effectively solving the drawbacks of the conventional lock core in use.

A lock core structure of the invention comprising:

a lock core seat, an accommodating chamber being disposed in the lock core seat, an inner wall surface of the accommodating chamber being provided with an embedding groove, the lock core seat being provided with a key insertion hole;

a lock core shell disposed in the accommodating chamber of the lock core seat, a wall surface of the lock core shell being provided with a cutting groove and a notch, a plurality of lock plates and a plurality of washers being alternately provided in the lock core shell, each of the lock plates being provided with a key hole, an outer edge of each of the lock plates being provided with an arc notch, the outer edge of each of the lock plates being further provided with a protrusion, the protrusion being disposed in the notch of the lock core shell, each of the washers being provided with a perforation, an outer edge of each of the washers being provided with an arc notch, the outer edge of each of the washers being further provided with a flange, the flange being disposed in the notch of the lock core shell;

a positioning plate disposed at an end portion of the lock core shell and placed into the accommodating chamber of the lock core seat, a key hole being provided on the positioning plate, two corresponding long edges of the key hole being provided with a convex body respectively; and a latch lever with a part embedded in the cutting groove of the lock core shell, and embedded in the arc notches of the lock plates and the washers, and another part of the latch lever being embedded in the embedding groove of the lock core seat;

characterized in that: a wall of the accommodating chamber of the lock core seat is provided with an accommodating groove, one side of the accommodating groove is provided with a shaft hole, another side of the accommodating groove is provided with a groove, inside the accommodating chamber of the lock core seat is annularly provided with a ring groove, an inner bottom surface of the lock core shell is provided with a slide groove, inside the slide groove is provided with a concave hole, a push plate is provided in the slide groove of the lock core shell, a perforation is provided on the push plate, a brake bolt plate is provided in the accommodating groove of the lock core seat, one side of the brake bolt plate is provided with a pivot shaft, the pivot shaft is disposed in the shaft hole of the lock core seat, a compression spring is provided in the groove of the lock core seat, the compression spring pushes against the brake bolt plate, a positioning baffle is provided in the accommodating chamber of the lock core seat and is located at a bottom of the lock core shell, the positioning baffle is provided with a through hole, the positioning baffle is protrudingly provided with a first baffle corresponding to a position of the embedding groove of the lock core seat, the positioning baffle is protrudingly provided with a second baffle corresponding to positions of the accommodating groove and the groove of the lock core seat, a retaining ring is provided on an outer side of the positioning baffle, and the retaining ring is embedded in the ring groove of the lock core seat.

The lock core structure of the invention has the advantages: when a key is used to unlock the lock, the key must be completely inserted into the lock core before the lock core can be rotated to form an unlocking mechanism, which is capable of preventing each of the lock plates from being arbitrarily rotated when the key is not fully inserted to reach the inner bottom surface of the lock core shell, thereby achieving a long service life for the lock core structure and an optimum anti-theft efficacy.

DETAILED DESCRIPTION OF THE INVENTION

Regarding the technical means adopted by the invention to achieve the above-mentioned object and efficacy, a preferred and feasible embodiment is explained in details hereunder in conjunction with the figures.

Figure 1:
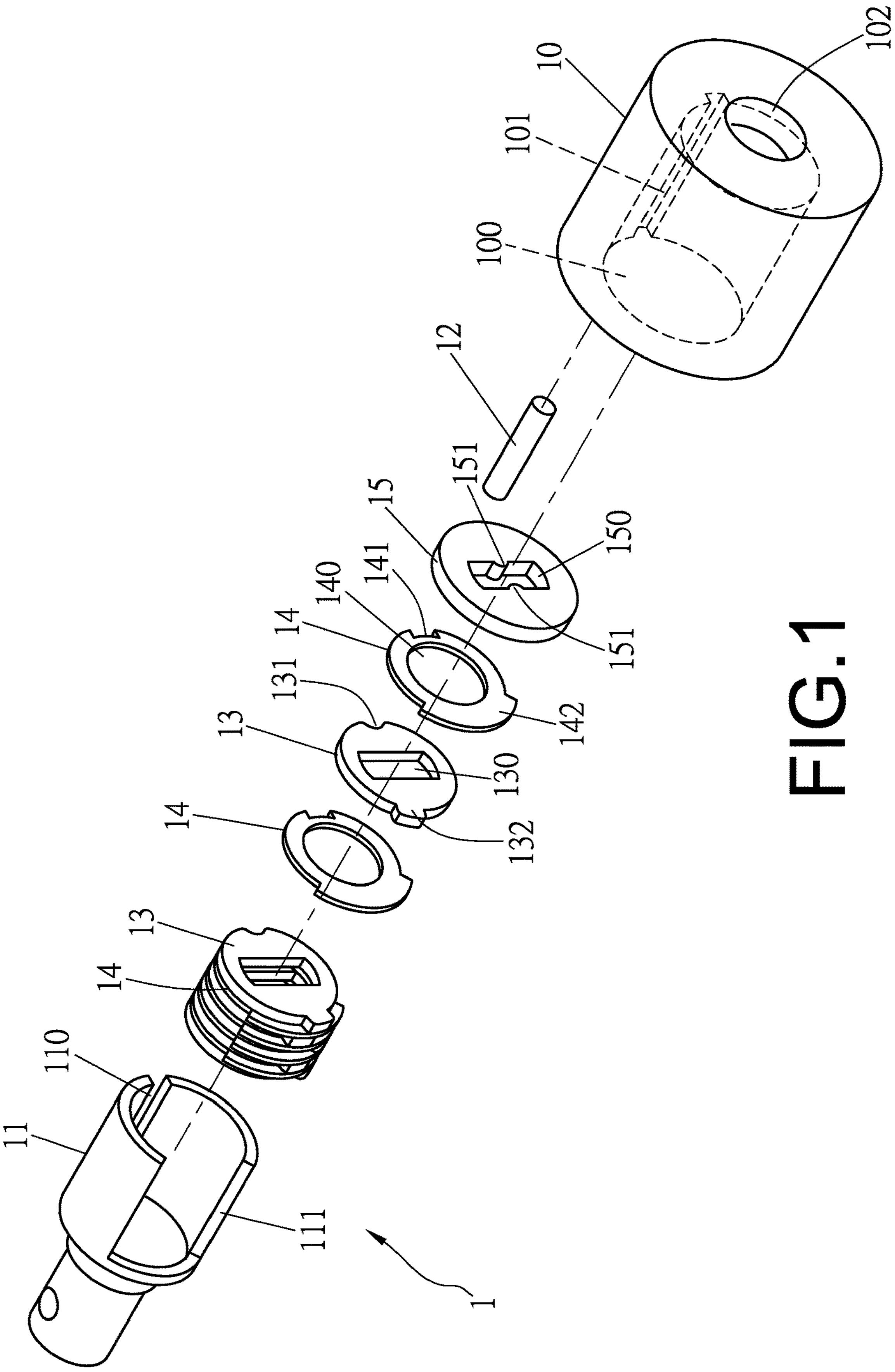
FIG. 1 is a perspective exploded view of a conventional lock core structure.
Figure 2:
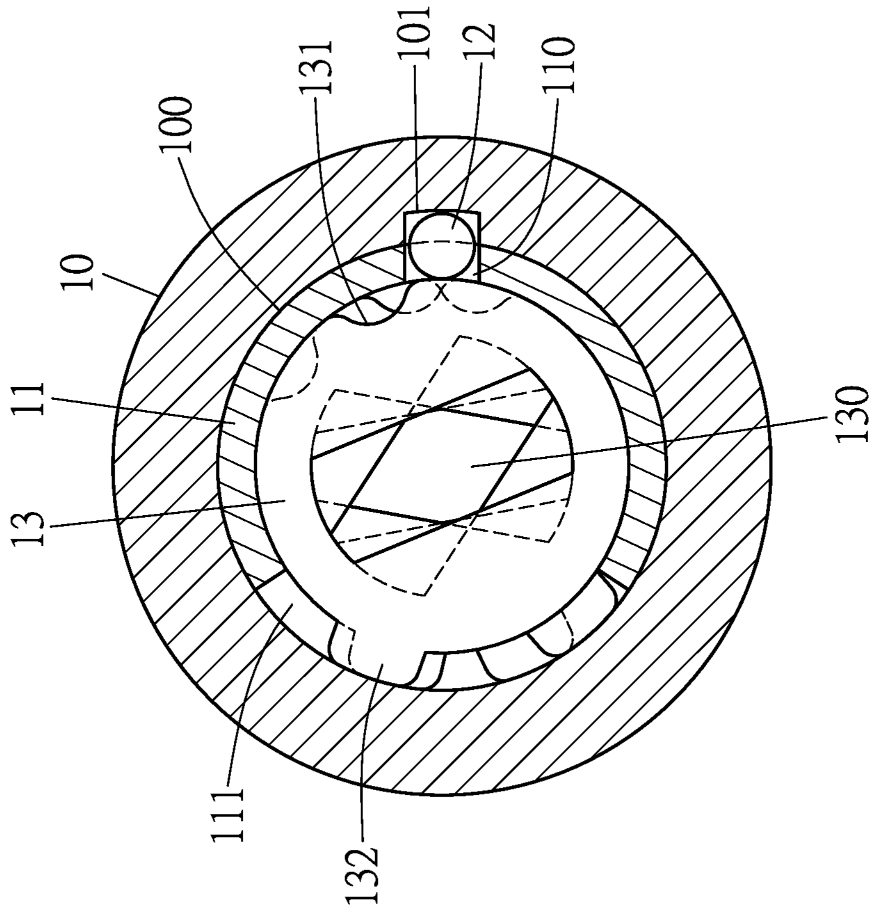
FIG. 2 is a cross-sectional view of the conventional lock core structure.
Figure 3:
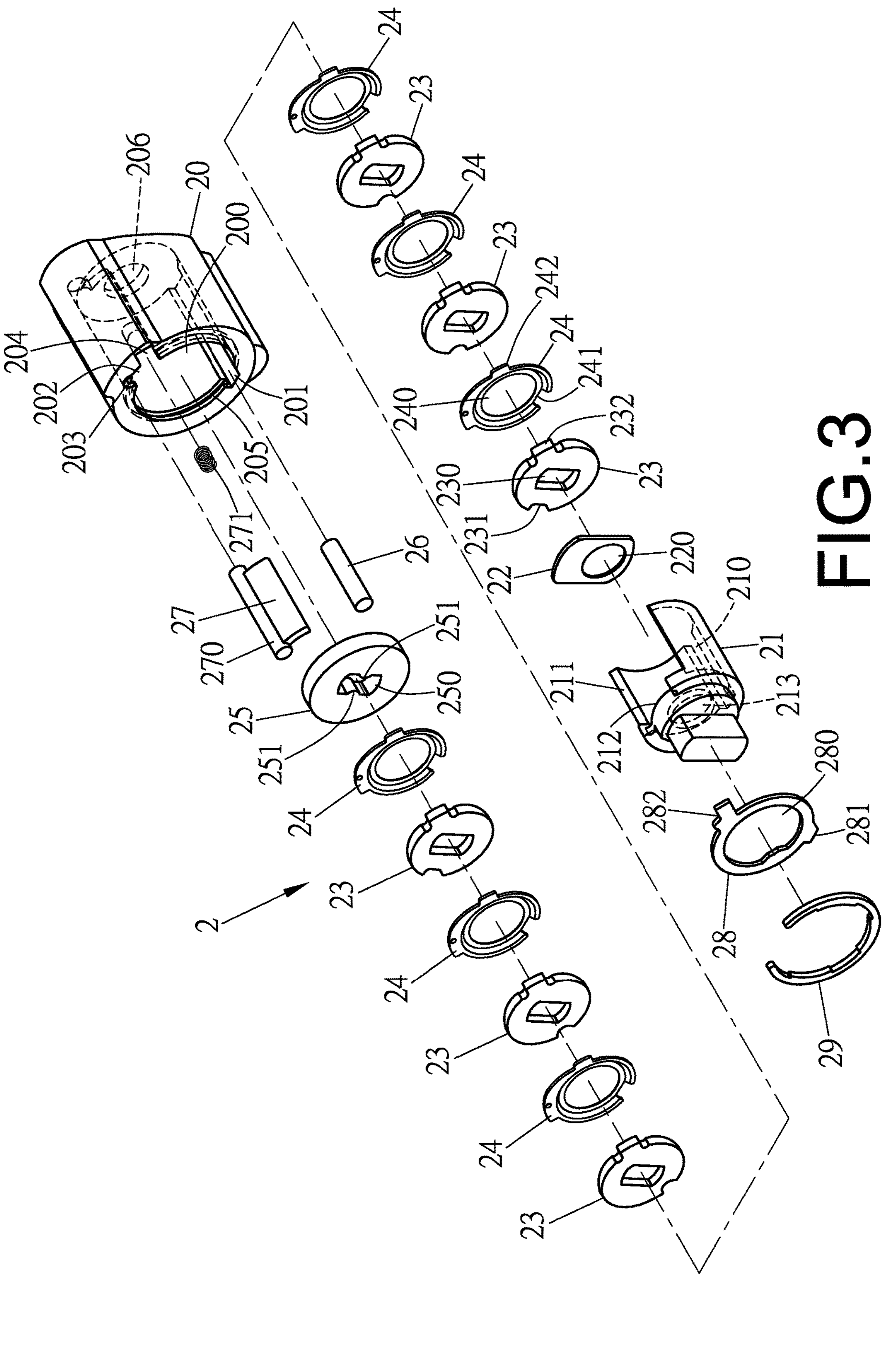
FIG. 3 is a perspective exploded view of one embodiment of the invention.
Figure 4:
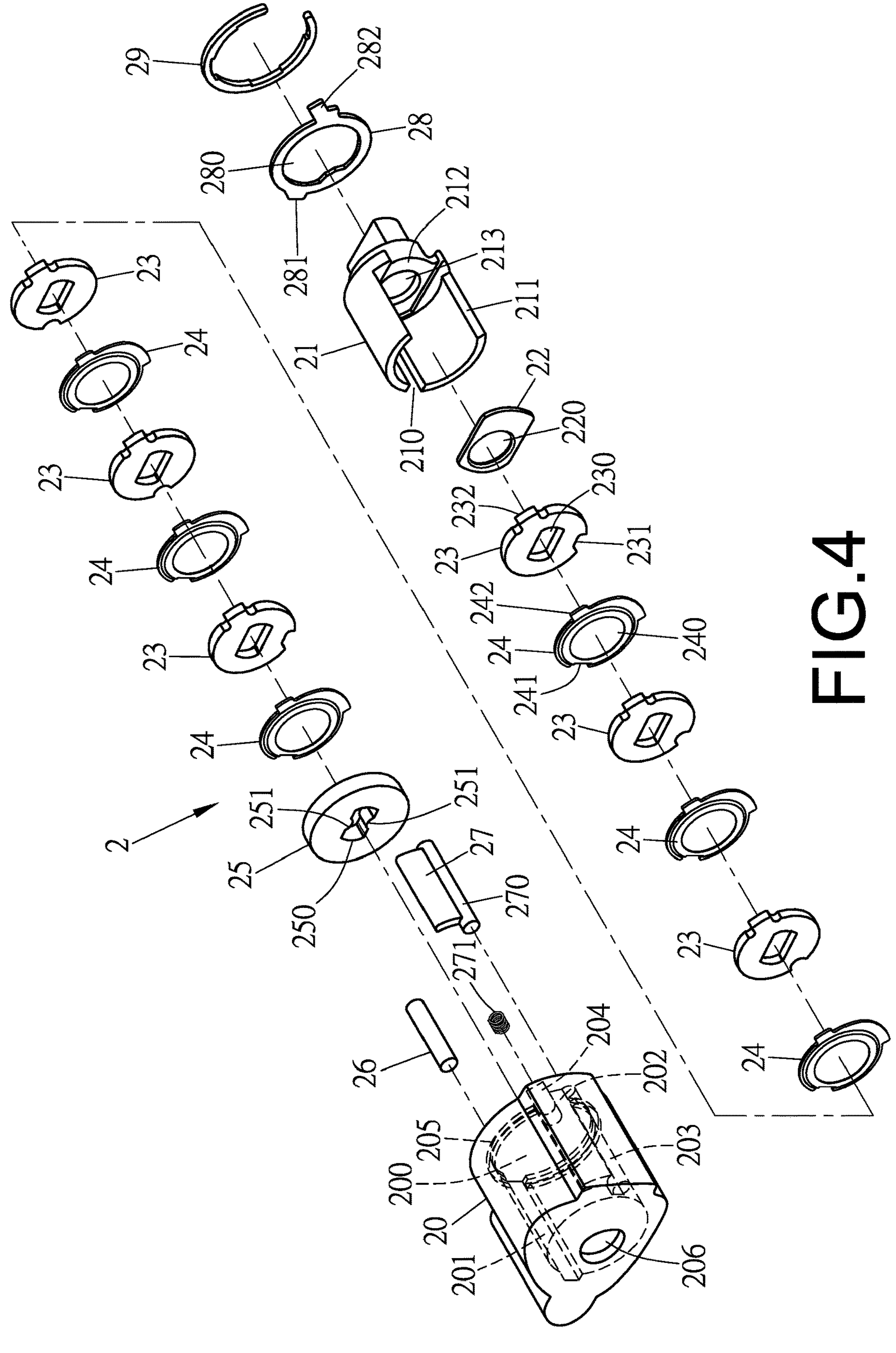
FIG. 4 is a perspective exploded view from another angle of one embodiment of the invention.
Figure 5:
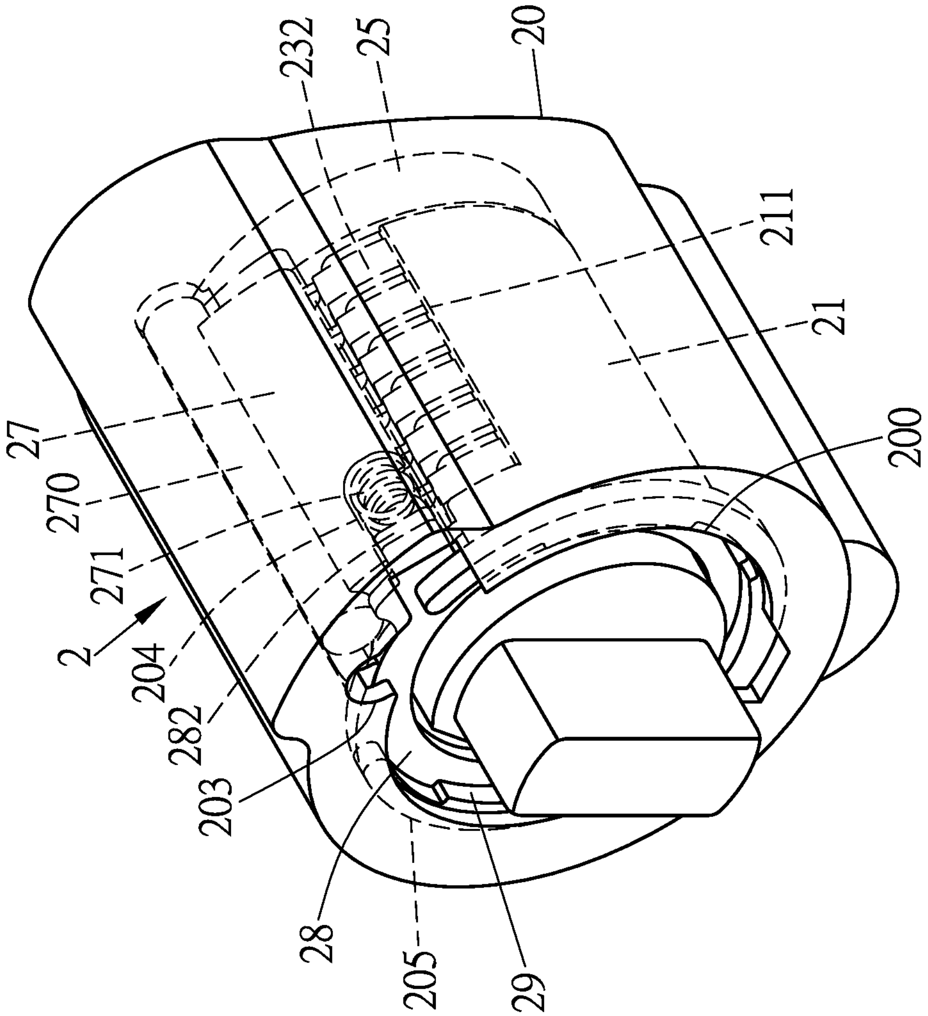
FIG. 5 is a perspective assembly view of one embodiment of the invention.

Please refer to FIGS. 3 to 5 for one embodiment of the invention. A lock core structure of the invention is mainly provided with a lock core 1, the lock core 1 is composed of a lock core seat 20, a lock core shell 21, a push plate 22, a plurality of lock plates 23, a plurality of washers 24, a positioning plate 25, a latch lever 26, a brake bolt plate 27, a positioning baffle 28, and a retaining ring 29. The lock core seat 20 is provided with an accommodating chamber 200, a wall surface of the accommodating chamber 200 is provided with an embedding groove 201, and the wall surface of the accommodating chamber 200 is further provided with an accommodating groove 202. One side of the accommodating groove 202 is provided with a shaft hole 203, another side of the accommodating groove 202 is provided with a groove 204, and inside the accommodating chamber 200 of the lock core seat 20 is annularly provided with a ring groove 205. The lock core seat 20 is provided with a key insertion hole 206, the lock core shell 21 is disposed in the accommodating chamber 200 of the lock core seat 20, and a wall surface of the lock core shell 21 is provided with a cutting groove 210 and a notch 211. An inner bottom surface of the lock core shell 21 is provided with a slide groove 212, inside the slide groove 212 is provided with a concave hole 213, the push plate 22 is provided in the slide groove 212 of the lock core shell 21, and a perforation 220 is provided on the push plate 22. The lock plates 23 and the washers 24 are alternately provided in the lock core shell 21. Each of the lock plates 23 is provided with a key hole 230, an outer edge of each of the lock plates 23 is provided with an arc notch 231, the arc notch 231 is provided for embedding the latch lever 26, the outer edge of each of the lock plates 23 is further provided with a protrusion 232, and the protrusion 232 is disposed in the notch 211 of the lock core shell 21. Each of the washers 24 is provided with a perforation 240, an outer edge of each of the washers 24 is provided with an arc notch 241, the arc notch 241 is provided for embedding the latch lever 26, the outer edge of each of the washers 24 is further provided with a flange 242, and the flange 242 is disposed in the notch 211 of the lock core shell 21. The positioning plate 25 is disposed at an end portion of the lock core shell 21, a key hole 250 is provided on the positioning plate 25, and two corresponding long edges of the key hole 250 are provided with a convex body 251 respectively. A part of the latch lever 26 is embedded in the cutting groove 210 of the lock core shell 21, and another part of the latch lever 26 is embedded in the embedding groove 201 of the lock core seat 20. The brake bolt plate 27 is provided in the accommodating groove 202 of the lock core seat 20, one side of the brake bolt plate 27 is provided with a pivot shaft 270, the pivot shaft 270 is disposed in the shaft hole 203 of the lock core seat 20, a compression spring 271 is provided in the groove 204 of the lock core seat 20, and the compression spring 271 pushes against the brake bolt plate 27. The positioning baffle 28 is provided in the accommodating chamber 200 of the lock core seat 20 and is located at a bottom of the lock core shell 21, the positioning baffle 28 is provided with a through hole 280, the positioning baffle 28 is protrudingly provided with a first baffle 281 corresponding to a position of the embedding groove 201 of the lock core seat 20, and the positioning baffle 28 is protrudingly provided with a second baffle 282 corresponding to positions of the accommodating groove 202 and the groove 204 of the lock core seat 20. The retaining ring 29 is provided on an outer side of the positioning baffle 28, and the retaining ring 29 is embedded in the ring groove 205 of the lock core seat 20. Thereby, the lock core structure of the invention is formed.

Please refer to FIGS. 3 to 6 for assembling. Firstly, place the push plate 22 into the slide groove 212 of the lock core shell 21, and then sequentially insert the lock plates 23 and the washers 24 into the lock core shell 21 alternately, the protrusion 232 of each of the lock plates 23 and the flange 242 of each of the washers 24 are aligned with one another and are disposed in the notch 211 of the lock core shell 21, and then a part of the latch lever 26 is embedded in the cutting groove 210 of the lock core shell 21. The positioning plate 25 is disposed at the end portion of the lock core shell 21, the compression spring 271 is placed in the groove 204 of the lock core seat 20, and the brake bolt plate 27 is disposed in the accommodating groove 202 of the lock core seat 20. The pivot shaft 270 of the brake bolt plate 27 is disposed in the shaft hole 203 of the lock core seat 20, so that the brake bolt plate 27 is capable of rotating and swinging by using the pivot shaft 270 as a pivot point, the compression spring 271 pushes against the brake bolt plate 27, and then the positioning plate 25 and the lock core shell 21 assembled as described above are placed in the accommodating chamber 200 of the lock core seat 20. Another part of the latch lever 26 protruded on the lock core shell 21 is embedded in the embedding groove 201 of the lock core seat 20, and the positioning baffle 28 is disposed in the accommodating chamber 200 of the lock core seat 20. The bottom of the lock core shell 21 is inserted into the through hole 280 of the positioning baffle 28, the first baffle 281 of the positioning baffle 28 is embedded in the embedding groove 201 of the lock core seat 20 for positioning, and the second baffle 282 of the positioning baffle 28 is disposed in the accommodating groove 202 and the groove 204 of the lock core seat 20, so that the brake bolt plate 27 and the compression spring 271 can be retained and positioned. Then the retaining ring 29 is snapped into the ring groove 205 of the lock core seat 20, and the positioning baffle 28 is positioned in the accommodating chamber 200 of the lock core seat 20, thereby the entire assembly can be completed.

Figure 6:
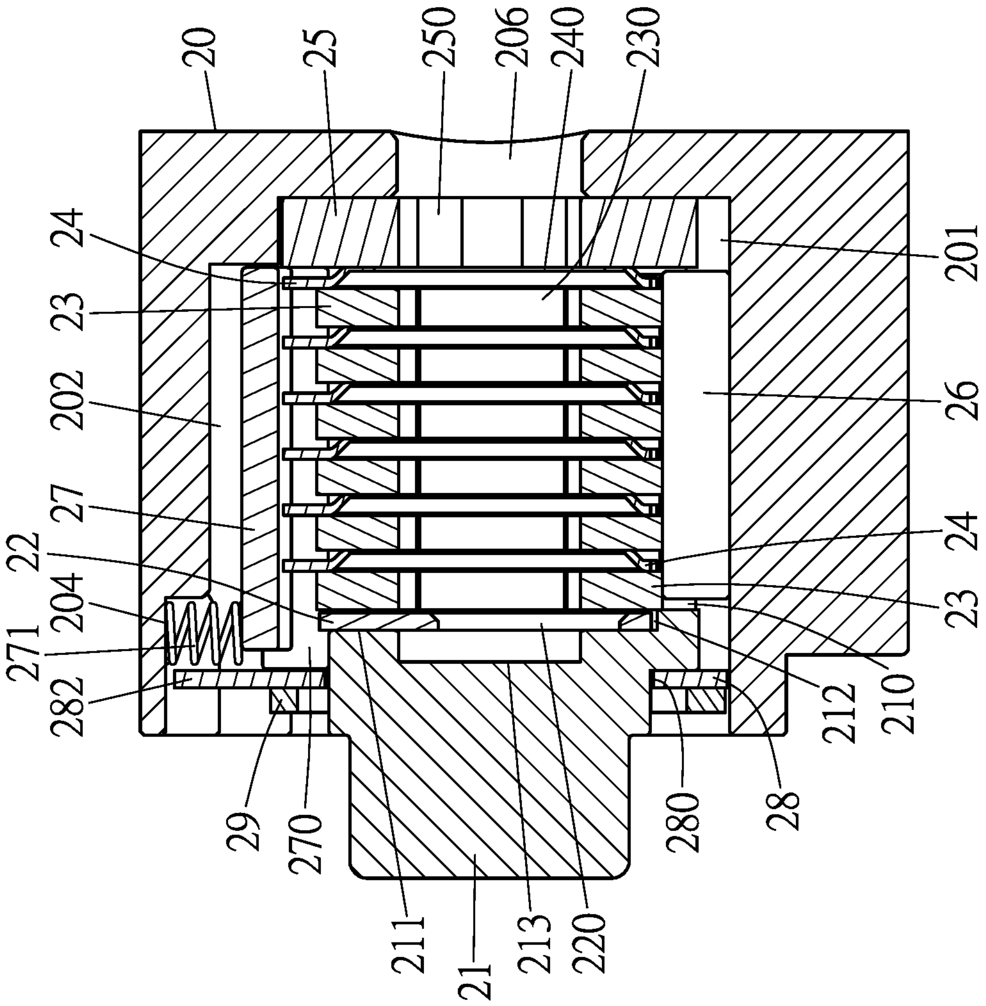
FIG. 6 is an assembled cross-sectional view of one embodiment of the invention.
Figure 7:
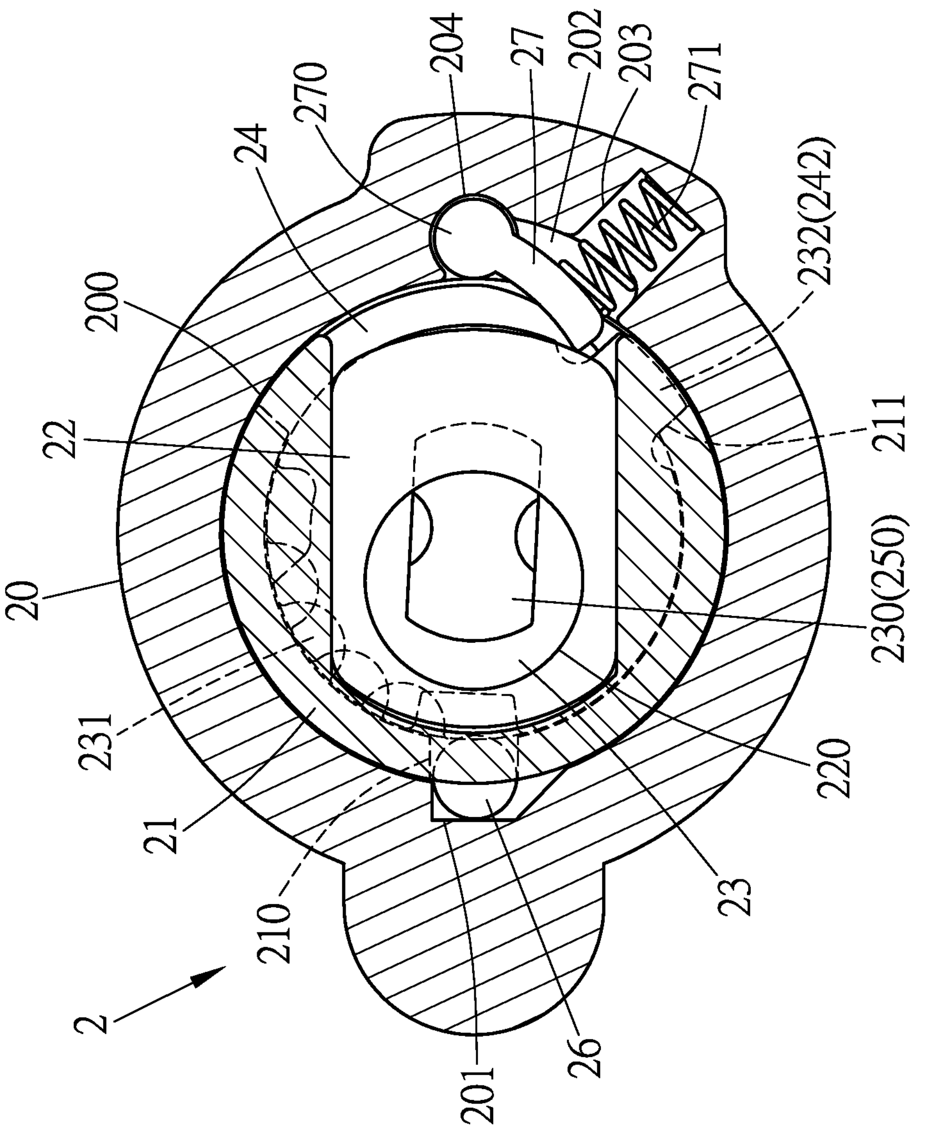
FIG. 7 is a cross-sectional view of a lock core without a key inserted according to one embodiment of the invention.
Figure 8:
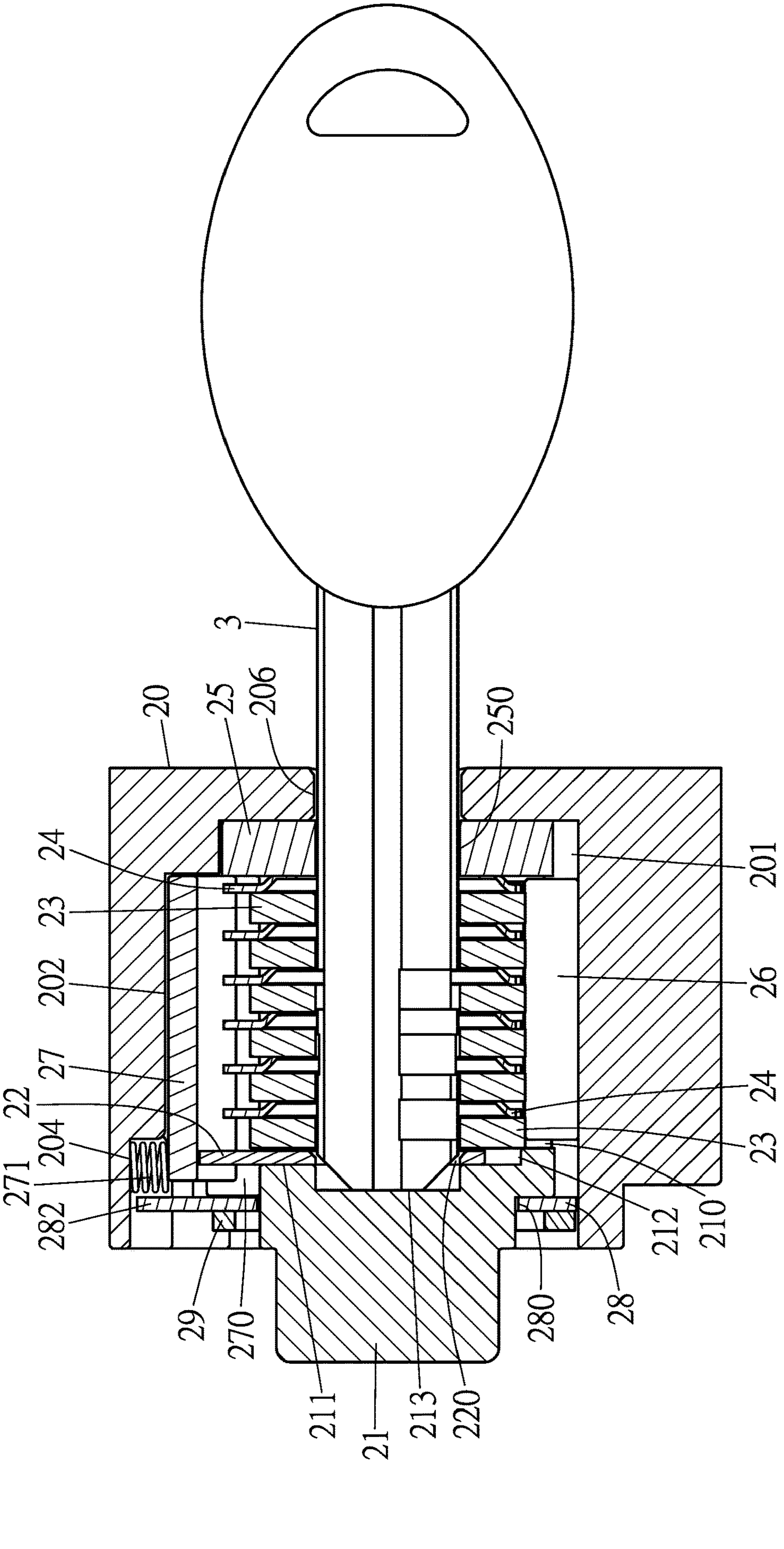
FIG. 8 is an assembled cross-sectional view of the key inserted into a key hole according to one embodiment of the invention.
Figure 9:
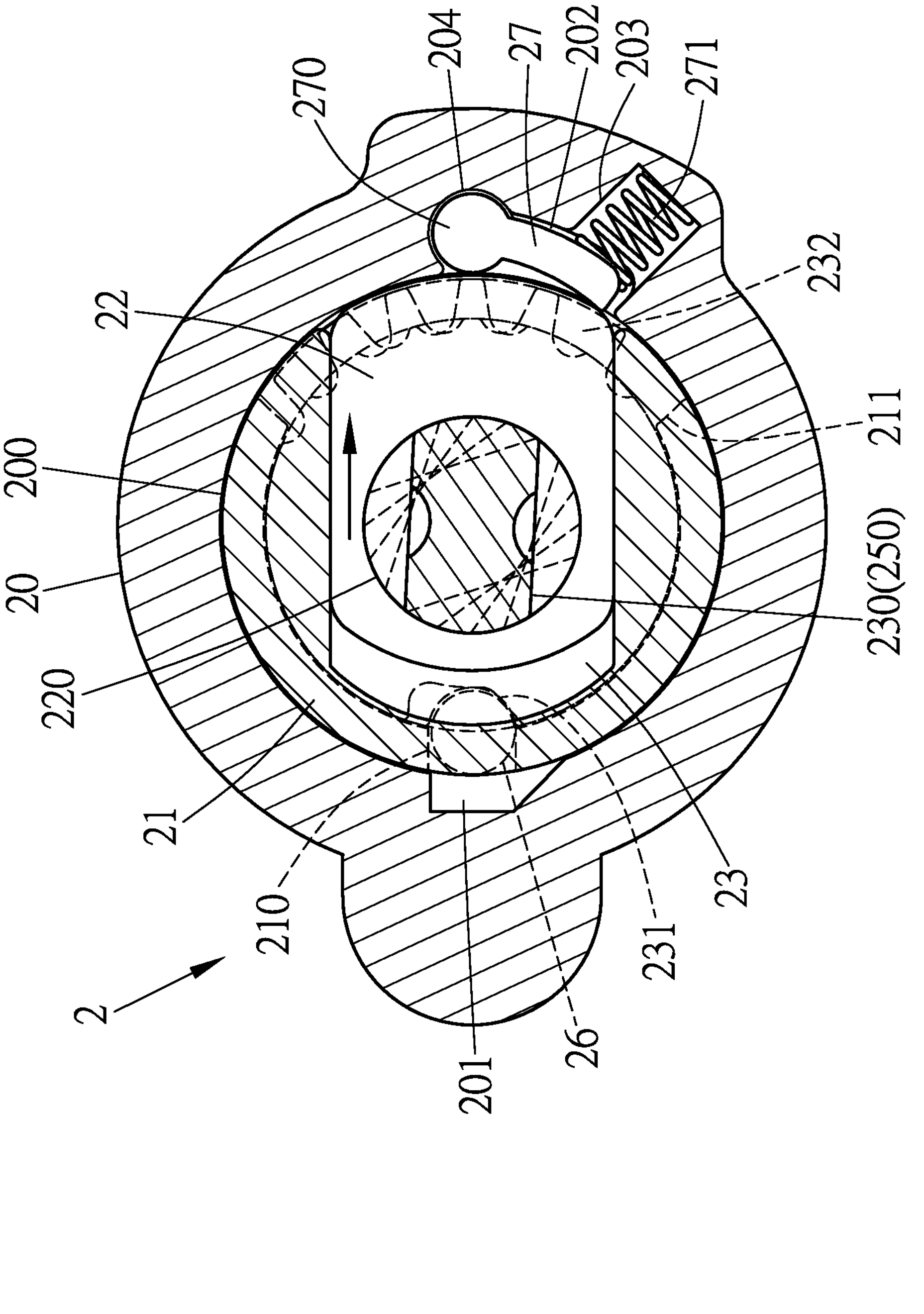
FIG. 9 is a cross-sectional view of the lock core with the key inserted into the key hole according to one embodiment of the invention.

The lock core structure of the invention can be assembled on various types of locks. Please refer to FIGS. 6 to 9 for using the lock core structure of the invention. When a key 3 is not inserted into the key insertion hole 206 of the lock core seat 20, and the key hole 250 of the positioning plate 25 and the key hole 230 of each of the lock plates 23 (as shown in FIGS. 6 and 7), the protrusion 232 of each of the lock plates 23 and the flange 242 of each of the washers 24 in the lock core shell 21 are blocked by the brake bolt plate 27 and cannot be rotated (as shown in FIG. 7). When a user inserts the correct key 3 into the key insertion hole 206 of the lock core seat 20 and the key hole 250 of the positioning plate 25 and the key hole 230 of each of the lock plates 23, if the key 3 is not inserted to reach the bottom, the protrusion 232 of each of the lock plates 23 and the flange 242 of each of the washers 24 are still blocked by the brake bolt plate 27 and cannot be rotated, so the key 3 must be inserted to reach the inner bottom surface of the lock core shell 21, by inserting the key 3 into the perforation 220 of the push plate 22, the push plate 22 is pushed by the key 3 to slide in the slide groove 212 of the lock core shell 21, an end portion of the push plate 22 pushes against the brake bolt plate 27 to rotate (as shown in FIGS. 8 and 9), the brake bolt plate 27 rotates and presses the compression spring 271 to make the compression spring 271 in an elastic compression state. After the brake bolt plate 27 is pushed by the push plate 22 to rotate and move into the accommodating groove 202, the protrusion 232 of each of the lock plates 23 and the flange 242 of each of the washers 24 are no longer blocked. In this way, the key 3 can be turned to drive the lock core shell 21 to rotate to complete the unlocking action. After the key 3 is done with unlocking and turned straight to be pulled out from the lock core, the protrusion 232 of each of the lock plates 23 and the flange 242 of each of the washers 24 are aligned with one another again, the push plate 22 is no longer pushed by the key 3, the brake bolt plate 27 and the push plate 22 are pushed back to the original positions by the elastically restored compression spring 271 (as shown in FIGS. 6 and 7), so that the brake bolt plate 27 blocks the protrusion 232 of each of the lock plates 23 and the flange 242 of each of the washers 24 in the lock core shell 21 again, and therefore the lock plates 23 and the washers 24 cannot be rotated. By disposing the slide groove 212 and the push plate 22 on the inner bottom surface of the lock core shell 21 of the invention, when the key 3 is not completely inserted to reach the inner bottom surface of the lock core shell 21, the key 3 cannot be turned, which is capable of preventing the key 3 from being deformed caused by rotating the lock core forcefully, prolonging a service life of the key 3 and the lock core structure, and providing an excellent anti-theft efficacy.

In summary, the invention has indeed achieved the intended object and efficacy of use, and is more ideal and practical than the prior art. However, the above-mentioned embodiment is merely specific descriptions of the preferred embodiment of the invention, the embodiment is not intended to limit the claims of the invention, and all other equivalent changes and modifications completed without departing from the technical means disclosed in the invention should be included in the claims covered by the invention.

What is claimed is:

1. A lock core structure comprising:

a lock core seat, an accommodating chamber being disposed in the lock core seat, an inner wall surface of the accommodating chamber being provided with an embedding groove, the lock core seat being provided with a key insertion hole;

a lock core shell disposed in the accommodating chamber of the lock core seat, a wall surface of the lock core shell being provided with a cutting groove and a notch, a plurality of lock plates and a plurality of washers being alternately provided in the lock core shell, each of the lock plates being provided with a lock plate key hole, an outer edge of each of the lock plates being provided with an lock plate arc notch, the outer edge of each of the lock plates being further provided with a protrusion, the protrusion being disposed in the notch of the lock core shell, each of the washers being provided with a perforation, an outer edge of each of the washers being provided with an washer arc notch, the outer edge of each of the washers being further provided with a flange, the flange being disposed in the notch of the lock core shell;

a positioning plate disposed at an end portion of the lock core shell and placed into the accommodating chamber of the lock core seat, a positioning plate key hole being provided on the positioning plate, two corresponding long edges of the positioning plate key hole being provided with a convex body respectively; and a latch lever with a part embedded in the cutting groove of the lock core shell, another part of the latch lever being embedded in the embedding groove of the lock core seat;

characterized in that: a wall of the accommodating chamber of the lock core seat is provided with an accommodating groove, one side of the accommodating groove is provided with a shaft hole, another side of the accommodating groove is provided with a groove, inside the accommodating chamber of the lock core seat is annularly provided with a ring groove, an inner bottom surface of the lock core shell is provided with a slide groove, inside the slide groove is provided with a concave hole, a push plate is provided in the slide groove of the lock core shell, a perforation is provided on the push plate, a brake bolt plate is provided in the accommodating groove of the lock core seat, one side of the brake bolt plate is provided with a pivot shaft, the pivot shaft is disposed in the shaft hole of the lock core seat, a compression spring is provided in the groove of the lock core seat, the compression spring pushes against the brake bolt plate, a positioning baffle is provided in the accommodating chamber of the lock core seat and is located at a bottom of the lock core shell, the positioning baffle is provided with a through hole, the positioning baffle is protrudingly provided with a first baffle corresponding to a position of the embedding groove of the lock core seat, the positioning baffle is protrudingly provided with a second baffle corresponding to positions of the accommodating groove and the groove of the lock core seat, a retaining ring is provided on an outer side of the positioning baffle, and the retaining ring is embedded in the ring groove of the lock core seat.

* * * * *